United States Patent
Tuunanen et al.

(10) Patent No.: US 6,463,141 B1
(45) Date of Patent: Oct. 8, 2002

(54) DISTRIBUTION OF SERVICES IN TELECOMMUNICATIONS NETWORK

(75) Inventors: Heikki Tuunanen, Espoo (FI); Keijo Palviainen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/663,575

(22) Filed: Sep. 12, 2000

Related U.S. Application Data

(63) Continuation of application No. PCT/FI99/00301, filed on Apr. 9, 1999.

(30) Foreign Application Priority Data

Apr. 9, 1998 (FI) .................................................. 980823
Sep. 11, 1998 (FI) .................................................. 981961

(51) Int. Cl.⁷ .......................... H04M 3/42; H04M 7/00; G06F 7/00
(52) U.S. Cl. ............................ 379/201.05; 379/221.09; 379/221.12; 707/10
(58) Field of Search .................... 379/201.01, 201.05, 379/201.12, 221.08, 221.09, 221.1, 221.11, 221.12, 269, 279; 707/1, 10; 709/223, 224

(56) References Cited

U.S. PATENT DOCUMENTS

| | | | | |
|---|---|---|---|---|
| 5,999,610 A | * | 12/1999 | Lin et al. | 370/259 |
| 6,098,094 A | * | 8/2000 | Barnhouse et al. | 709/203 |
| 6,169,794 B1 | * | 1/2001 | Oshimi et al. | 379/221.09 |
| 6,282,280 B1 | * | 8/2001 | Rekieta et al. | 379/207.02 |

FOREIGN PATENT DOCUMENTS

| | | | |
|---|---|---|---|
| EP | 0830039 | 3/1998 | H04Q/3/00 |
| EP | 0873028 | 10/1998 | H04Q/3/00 |
| GB | 2315639 | 2/1998 | H04Q/3/00 |
| WO | WO 96/08909 | 3/1996 | H04M/3/42 |
| WO | WO 97/07637 | 2/1997 | H04Q/3/00 |
| WO | WO 97/36431 | 10/1997 | H04Q/3/00 |

OTHER PUBLICATIONS

"Distributed Functional Plane For Intelligent Network CS–1"; International Telecommunication Union, Telecommunication Standardization Sector of ITU, Intelligent Network, ITU–T Recommendation Q.1214, Oct. 1995.

"ETS 300 374–1", European Telecommunication Standard, European Standards Institute, Cedex, France, Sep. 1994, pp. 127–168.

International Search Report for PCT/FI99/00301.

* cited by examiner

*Primary Examiner*—Harry S. Hong
(74) *Attorney, Agent, or Firm*—Altera Law Group, LLC

(57) ABSTRACT

It is advantageous to distribute tasks of network services logically into separate service programs and also physically into several control points. A problem in task distribution is the single point of control, whereby only one service program at a time can control the call. The invention concerns a method of service distribution to several service programs (SLP). A control relationship is formed between the switching point (SSP, MSC) and the service program (SLP) providing it with instructions. The method according to the invention is characterized in that the controllability of the relationship is divided into controllability classes, of which at least one is allocated to the service program (SLP) controlling the switching point (SSP, MSC) so that each controllability class is allocated to only one service program at a time, and the call is controlled by the service within the limitations of the control authorization of each controllability class.

35 Claims, 7 Drawing Sheets

DISTRIBUTION OF SERVICES IN TELECOMMUNICATIONS NETWORK

This is a Continuation of application No. PCT/FI99/00301, filed Apr. 9, 1999.

FIELD OF THE INVENTION

The invention relates to the distribution of services in a telecommunications network and the arrangement of control relationships for service programs.

BACKGROUND OF THE INVENTION

The rapid development of the telecommunication field has made it possible for operators to provide users with services of many different types. One such network architecture providing advanced services is called the Intelligent Network, for which the abbreviation IN is generally used. Examples of such services are the Virtual Private Network VPN, which allows the use of short numbers between subscribers of the private network, and the Personal Number, where the intelligent network re-routes calls made to the personal number in a manner controlled by the subscriber. IN-services are utilized by various networks, such as mobile communications networks and fixed networks connected to IN.

The physical architecture of the intelligent network is illustrated in FIG. 1, where the physical entities are shown as rectangles or cylinders and the functional entities located in them are shown as ovals. This architecture is described briefly below, since references will be made to an intelligent network environment in the description of the invention to follow. An interested reader may acquire a more detailed understanding of the intelligent network from ITU-T recommendations Q.121X or from Bellcore's AIN recommendations, for example. ETS 300 374-1 CorelNAP terms will be used in the description of the invention and of its background, but the invention can also be used in intelligent networks implemented in accordance with other intelligent network standards.

The Subscriber Equipment SE, which may be a telephone, a mobile station, a computer, or a fax, for example, is either connected directly to a Service Switching Point SSP or to a Network Access Point NAP. A service switching point SSP provides the user with access to the network and attends to all necessary dialing functions. The SSP is also able to detect the need for an intelligent network service request. In functional terms, the SSP includes call management, routing, and service dialing functions. In mobile communications networks, the mobile services switching center MSC can perform tasks which are performed by the SSP.

The Service Control Point SCP includes Service Logic Programs SLP, which are used to produce intelligent network services. In the following, "service program" will also be used as a shorter form for "service logic programs".

The Service Data Point SDP is a database containing such data about the subscriber and the intelligent network which the SCP service programs use for producing individualized services. The SCP may use SDP services directly by way of a signaling or data network.

The Intelligent Peripheral IP provides special functions, such as announcements, and voice and multiple dialing identification.

The signaling network shown in the figure is a network according to Signalling System Number 7 (SS7), a known signaling system described in the Specifications of Signalling System No. 7 of the CCITT (nowadays ITU-T), Melbourne 1988.

The Call Control Agent Function (CCAF) ensures that the end user (subscriber) has access to the network. Access to IN-services is implemented through additions made to existing digital exchanges. This is done by using the Basic Call State Model BCSM, which describes the various stages of call handling and includes those points or Detection Points DP where the call handling can be interrupted in order to start intelligent network services. At these detection points, the service logic entities of the intelligent network may be in an interaction relation with the basic call and connection management function. In the exchange, the call set-up is divided into two parts: the call set-up in the originating half and the call set-up in the terminating half. As a rough description, call handling in the originating half is related to the services of the calling subscriber, while call handling in the terminating half is related to the services of the called subscriber. The corresponding state models are the Originating Basic Call State Model (O-BCSM) and the Terminating Basic Call State Model (T-BCSM). The BCSM is a high-level state automaton description of those Call Control Functions (CCF) needed for setting up and maintaining a connection between the users. Functionality is added to this state model with the aid of the Service Switching Function (SSF) (cf. partial overlapping of CCFs and SSFs in FIG. 1) to make it possible to decide when intelligent network services (i.e., IN-services) should be requested. When IN-services have been requested, the Service Control Function (SCF), including the service logic of the intelligent network, attends to the service-related processing (in call establishment). Thus, the Service Switching Function SSF connects the Call Control Function CCF to the Service Control Function SCF and allows the Service Control Function SCF to control the Call Control Function CCF.

The intelligent network service is implemented in such a way that in connection with the encounter of service-related detection points the Service Switching Point SSP asks the Service Control Point SCP for instructions with the aid of messages relayed over the SSP/SCP interface. In intelligent network terminology these messages are called operations. The SCF may request, for example, that the SSF/CCF perform certain call or connection functions, such as charging or routing actions. The SCF may also send requests to the Service Data Function (SDF), which provides access to service-related data and network data of the intelligent network. Thus the SCF may request, for example, that the SDF fetches data concerning a certain service or that it updates this data.

The above functions involved in interaction with the subscriber are supplemented by a Specialised Resources Function SRF providing an interface for those network mechanisms. Examples are messages to the subscriber and the collection of the subscriber's dialing.

The following is a brief description of the role of the functional entities shown in FIG. 1 in terms of IN-services. The CCAF receives the service request made by the calling party, which is typically made by the calling party lifting the receiver and/or dialing a certain number series. The CCAF relays the service request further to the CCF/SSF for processing. The CCF has no service data, but it is programmed to identify those detection points where a SCP visit might be made. The CCF interrupts the call set-up for a moment and gives the service switching function SSF data about the detection point encountered (about the stage of call set-up). It is the duty of the SSF through use of predetermined criteria to interpret whether the task is a service request related to intelligent network services. If this is the case, the SSF sends to the SCF a standardized IN-service request, including data related to the call. The SCF receives the request and decodes it. Then it works together with the SSF/CCF, SRF, and SDF in order to produce the requested service for the end user.

As was presented above, service is started when the SSF sends to the SCF a standard IN-service request. The service request may be sent during certain stages of the call. FIG. 2 illustrates a few basic operations of a state-of-the-art function of an intelligent network at detection points. At point 21 the SSP sends to the SCP an InitialDP service request, including basic data on the call for starting the intelligent network service. Thereupon the arming of detection points in the SSP follows. At point 22 the SCP sends to the SSP a RequestReportBCSMEvent operation telling the SSP which detection points it should report to the SCP. Next, at point 23, the SCP typically sends charging and/or interaction operations, such as ApplyCharging (e.g. a request for a charging report) or PlayAnnouncement (give an announcement to the subscriber). At point 24 the SCP sends to the SSP a routing instruction, such as Connect (route the call to a new number) or Continue (continue the call set-up with the same data). When it meets the detection point reserved by the SCP, the SSP sends to the SCP an EventReportBCSM operation at point 26.

Detection points determined in intelligent network architecture are the primary mechanism for reporting various events. The events 21–24 in FIG. 2 described above relate to a detection point called the Trigger Detection Point (TDP). The SSP may make an initial inquiry concerning a service to the SCP in connection with a TDP detection point, and the SSP then receives instructions for call handling. Another type of detection point is called the Event Detection Point (EDP). Point 26 in FIG. 2 shows a moment when in the course of a call an EDP detection point is encountered. The SSP reports on the encounter with the detection point to the SCP, which at point 28 sends additional call instructions to it. The Event Detection Point Request required (EDP-R) is a detection point after the encounter of which the processing of the call at the detection point will stop until the SCP sends additional instructions. Arming of the EDP-R detection points creates a control relationship between the SSP and a particular service program of the SCP. A control relationship means that a session is going on between the call set-up half and the SCF, and during this session the SCF may give instructions to change the handling of the call. In a monitoring relationship the SCP is not able to affect the progress of the call handling; it can only ask the SSP to report on various events related to the call. In accordance with the current intelligent network standard, there can be only one control relationship but several monitoring relationships related to a call. Thus a problem with EDP-R detection points is that they prevent the production of any additional services. This is especially problematic when one service program reserves a control relationship for the whole duration of the call by arming a detection point to be met at the end of the call as an EDP-R detection point, whereby no more intelligent network services can be started during the call in question. The operation of an intelligent network is thus based on the fact that only one service program (SCP relationship) at a time can have a control relationship and can thus control the SSP. This principle is commonly referred to as a single point of control.

For capacity purposes and so on, it is advantageous to distribute the tasks of intelligent network services logically, e.g. according to their type of task, into separate service programs in one or several SCPs. The same applies for service packets used in other telecommunications networks, such as in mobile communications networks. Patent application publication GB-2315639 presents a method for implementing the control of a distributed service in IN. When the first control point SCP1 detects that at least a part of the service should be processed at another control point SCP2, SCP1 sends to the service switching point SSP a message, with precise instructions to send a service request to SCP2. This instruction includes the network address for the other control point SCP2 to which the control should be transferred. When the SSP sends the service request to SCP2, the connection between the SSP and SCP1 ends and a new connection is set up between the SSP and SCP2. The method according to the publication requires that each SCP knows the services of the other control points and is thus able to direct the service request of the SSP to the correct address. Availability of this data is thus a problem, with the solution according to the publication, especially in joint use of control points by different service providers. In addition, it is a problem with prior art solutions that only one service program at a time can give instructions to the switching point.

BRIEF SUMMARY OF THE INVENTION

It is the purpose of this invention to make possible a flexible distribution of service programs in a telecommunications network, as well as the versatile simultaneous use of the service programs.

These purposes are achieved through a method and a switching point according to the invention which are characterized by the independent claims. Different embodiments of the invention are presented in the dependent claims.

The invention is based on the idea that the controllability of a connection is divided into parts by grading different degrees of controllability, so-called controllability classes, within each of which there is preferably a single point of control. The controllability class defines a certain set of such instructions provided by the service program which are acceptable to the switching point in this controllability class. The controllability of connections is thus based on subfunctionality. Simultaneous controllability of several service programs is thus made possible, that is, permission to provide the switching point with call handling instructions can be given to several service programs to be carried out simultaneously, provided that the instructions belong to different controllability classes. Service programs pertaining to different controllability classes can thus simultaneously control the operation of the switching point through means determined by their respective controllability class. Available controllability classes are allocated to service programs according to the controllability requirement of said programs. The division of controllability is within the state model (O-BCSM or T-BCSM). The allocation of a controllability class in one BCSM of the call may also affect other BCSMs of the call, e.g. prevent services requiring the same controllability class from starting.

Distribution of the control of the switching point has the advantage that it makes possible the versatile starting of intelligent network services. The switching point can be controlled simultaneously by several service programs of different controllability classes as a multi-point of control.

Another advantage of service distribution according to the invention is that it makes possible diversified service combinations.

A further advantage of the method according to the invention is that service programs can be distributed more freely without adversely affecting functionality.

LIST OF FIGURES

The invention will now be described more closely in connection with preferable embodiments, with reference to the examples shown in FIGS. 3–10 in the appended drawings, wherein.

BRIEF DESCRIPTION OF THE INVENTION

Figure 1:
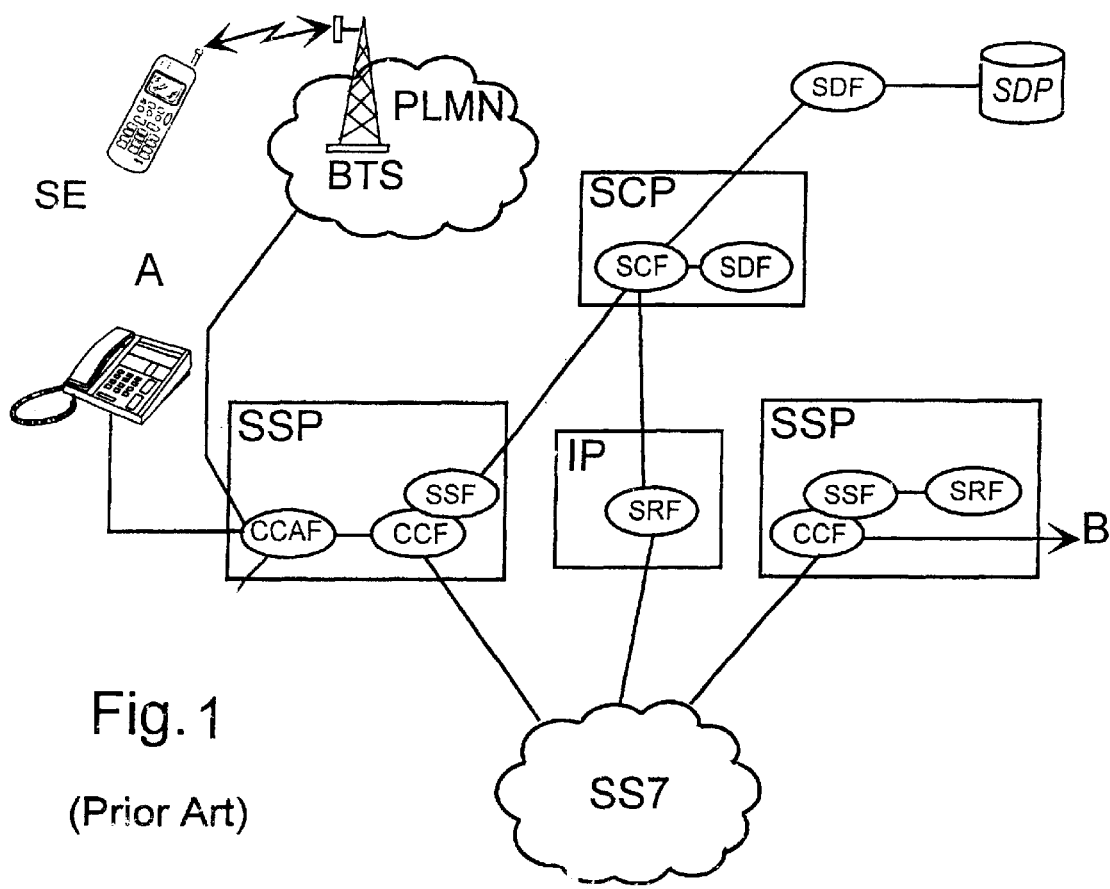
FIG. 1 shows parts of an intelligent network structure which are essential to the invention.
Figure 2:
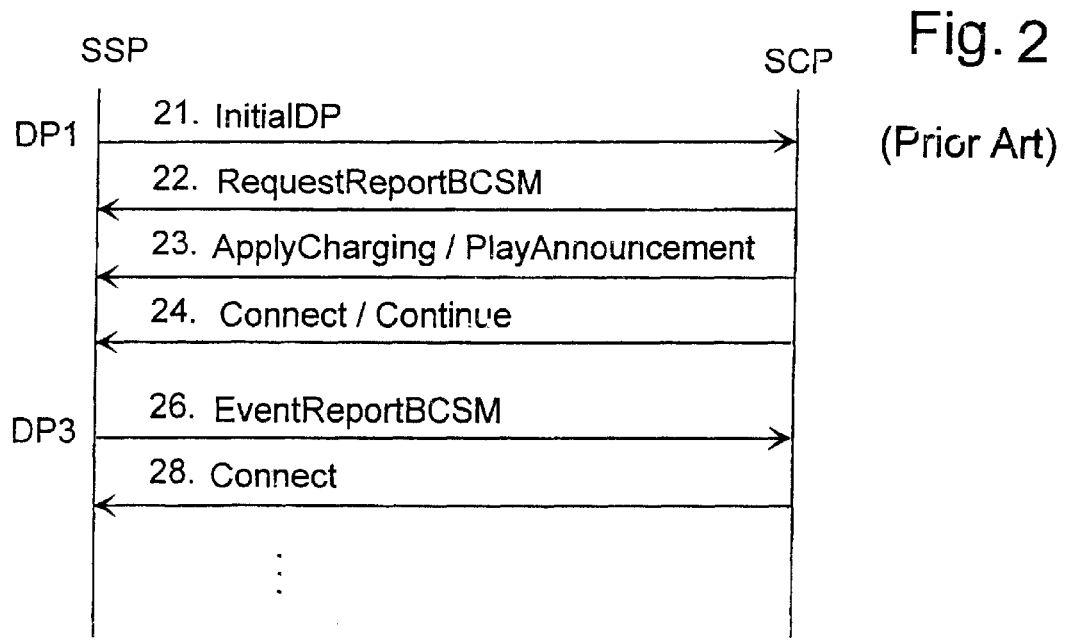
FIG. 2 shows a few basic operations of a state-of-the-art intelligent network at detection points.
Figure 3:
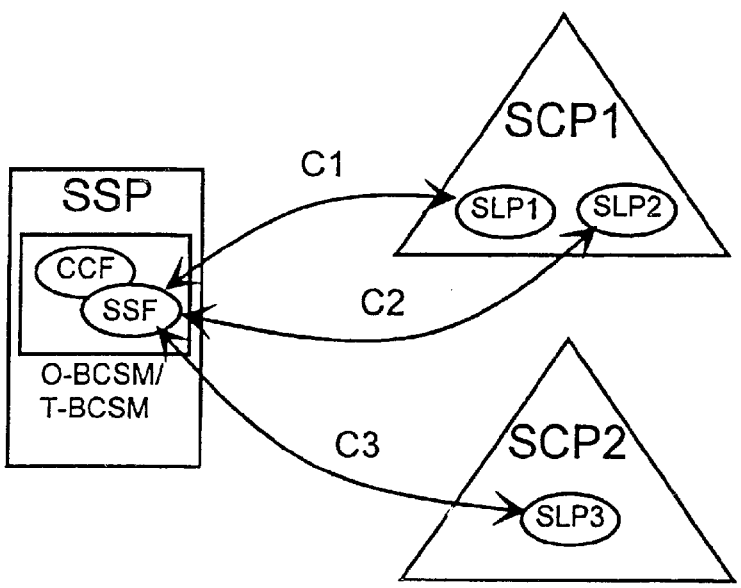
FIG. 3 shows an intelligent network structure with control relationships according to the invention.

In the following, the invention will be described more closely with reference to FIG. 3, which shows an intelligent network structure according to the invention. In the example shown in FIG. 3, intelligent network services are distributed to several service programs, SLP1, SLP2, and SLP3, which are located at two control points, SCP1 and SCP2 respectively. In the state model O-BCSM or T-BCSM of the switching point SSP, multiple control relationships can be formed for all service programs presented in the figure, with controllability classes in accordance with the present invention. For example, from service program SLP1 instructions may be given within the scope of controllability class C1, from service program SLP2 within controllability class C2, and from service program SLP3 within controllability class C3. Examples of different controllability classes are charging control, connection control, and user interaction control (e.g. the issuing of announcements or collection of subscriber's dialing). A service program may give instructions to the switching point only for matters within the scope of its own controllability class.

Figure 4:
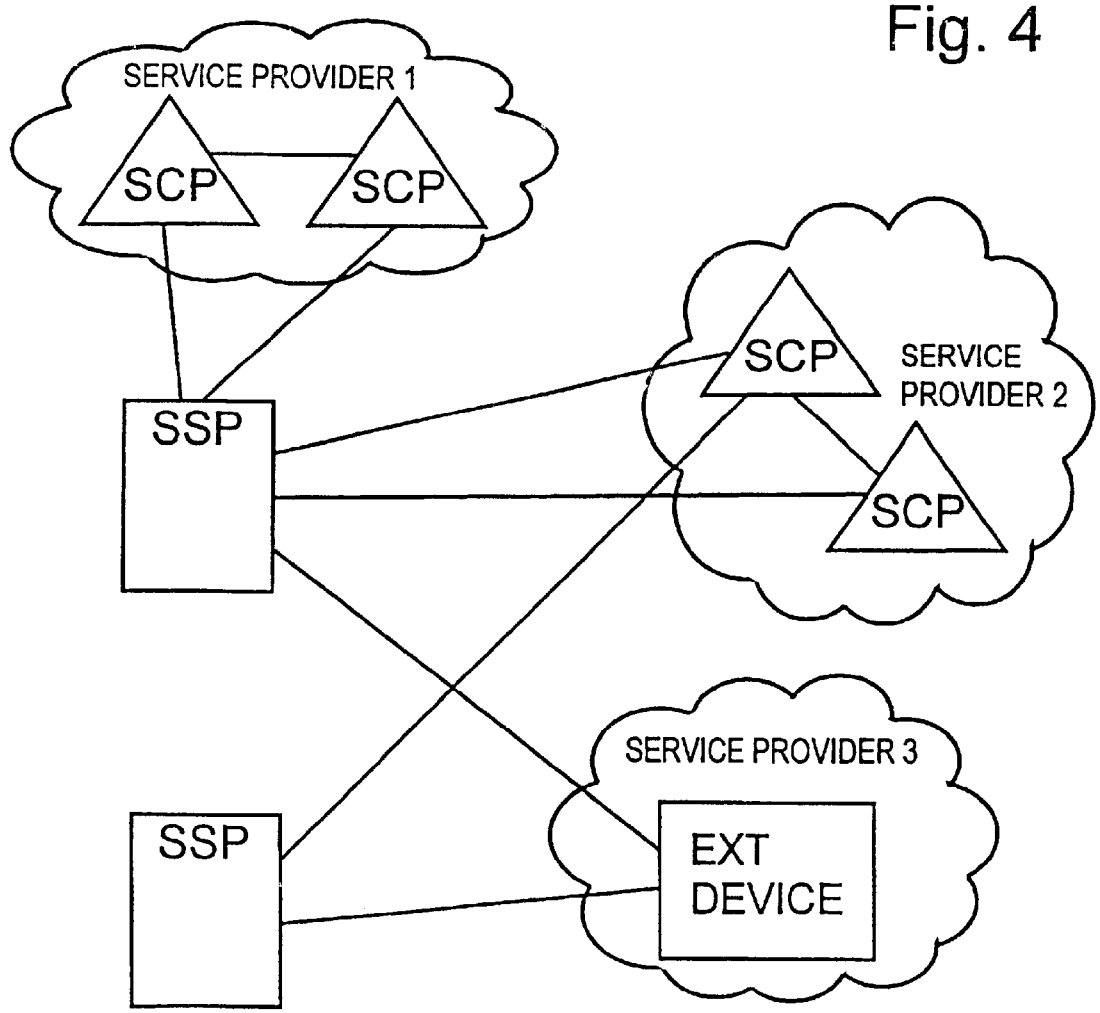
FIG. 4 shows an intelligent network structure where the switching point is controlled by control points of several different service providers in accordance with the invention.

FIG. 4 shows an intelligent network structure whereby the switching point is controlled by control elements of several different service providers 1–3, whose control elements are control points SCP shown in the figure and an external device (EXT DEVICE) executing the functionality of the control point. The figure shows with connecting lines those relationships between the SCP/ext device and the SSP according to the invention which control the call at the switching point, each within its own controllability class. The service programs of different service providers can thus control the switching point simultaneously. Although the invention is described mainly with the aid of SCP connections in the following, the method according to the invention can also be used with other kinds of connections requiring control between the switching point and a mechanism carrying out a functionality similar to the SCP, that is, when any function is performed in some service packet during a call. Such a mechanism providing an intelligent network service may either be located inside an exchange with a switching point or physically separated from the exchange.

In the following, the first and second embodiment of the invention are illustrated. In the example, three separate intelligent network service programs are used in the call, that is, Service Programs A, B, and C.

The task of Service Program A is a subscriber-based accessibility service of the calling subscriber, where switching may be attempted to the next number on the accessibility list if there is no response at the number dialed by the calling subscriber or if the routing otherwise fails. In addition, in service A the calling subscriber may belong to a short number service of a Virtual Private Network, so that the calling subscriber may add numbers to the accessibility list also as short dialing according to the VPN group. The controllability class according to the invention which is required by Service Program A is "connection control", and this is needed for the duration of the call set-up stage.

The task of Service Program B is a subscriber-based PrePaid service, where a certain time or total number of charging pulses is allocated for the subscriber in the SCP database which is available for the calls of the subscriber in question. If the number of charging pulses or time used by the subscriber for a call runs out, the call is released. The controllability class according to the invention which is required by service B is "charging control", and it is needed for the whole duration of the call.

The task of Service Program C is a so-called advertising call, that is, during a call the subscriber receives advertisements through IN-announcements at certain intervals. Service C needs control at least at the speech stage of the call and possibly also at the set-up stage. The controllability class according to the invention of service C is "user interaction control".

Figure 5A:
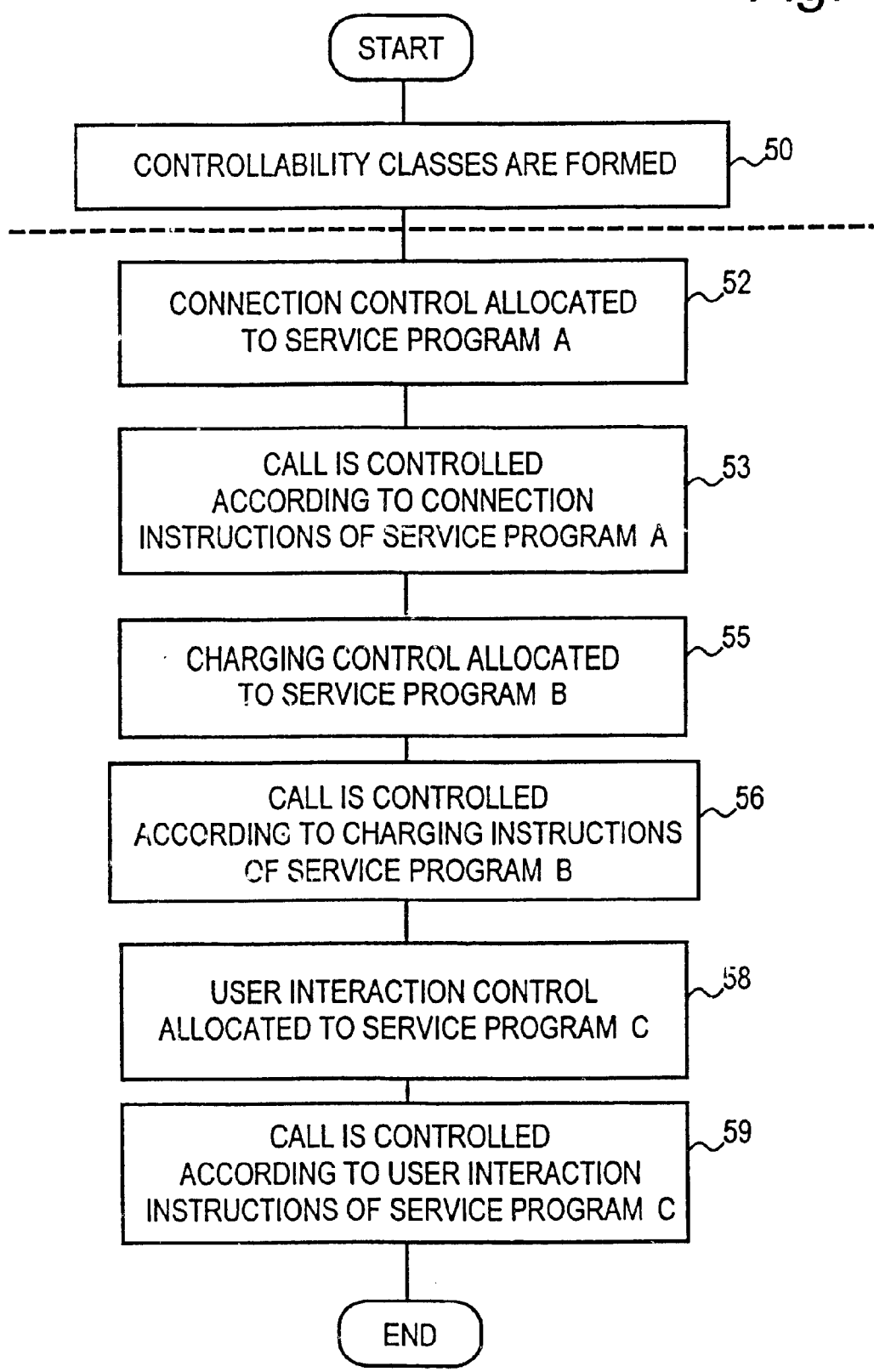
FIG. 5a is a flow chart of the first embodiment of the method according to the invention.

When controllability classes are used according to the invention as defined in the example, it is possible for services A, B, and C to control the switching point SSP simultaneously, each within the limits defined by their respective controllability class. FIG. 5a shows the first embodiment of the invention, whereby a controllability class is allocated to the service program by the switching point. At point 50 the controllability of the connection is divided according to the invention into controllability classes; in this example the classes are charging control, connection control, and user interaction control. The functionality of point 50 is not carried out separately for every call, but rather the division into controllability classes is typically performed once, whereupon the controllability classes according to the division are available for future use in call handling. At point 52 the switching point SSP allocates connection control to Service Program A. The SSP can also inform Service Program A of this allocation in an InitialDP-operation, for example. Instructions for routing from Service Program A are accepted (point 53). At point 55 the switching point SSP allocates charging control to Service Program B and may inform Service Program B of this. Instructions for charging from Service Program B are accepted (point 56). At point 58 the switching point SSP allocates user interaction control to Service Program C and may inform Service Program C of this. Instructions for user interaction from Service Program C are accepted (point 59). The controllability class needed for each service program is determined at the SSP according to the subscribers profile, based on the subscriber's home network, the triggering information or other configuration data of the service, or other relevant information available in the network. The information relating to the IN-service is advantageously stored in proximity to the switching point.

Figure 6:
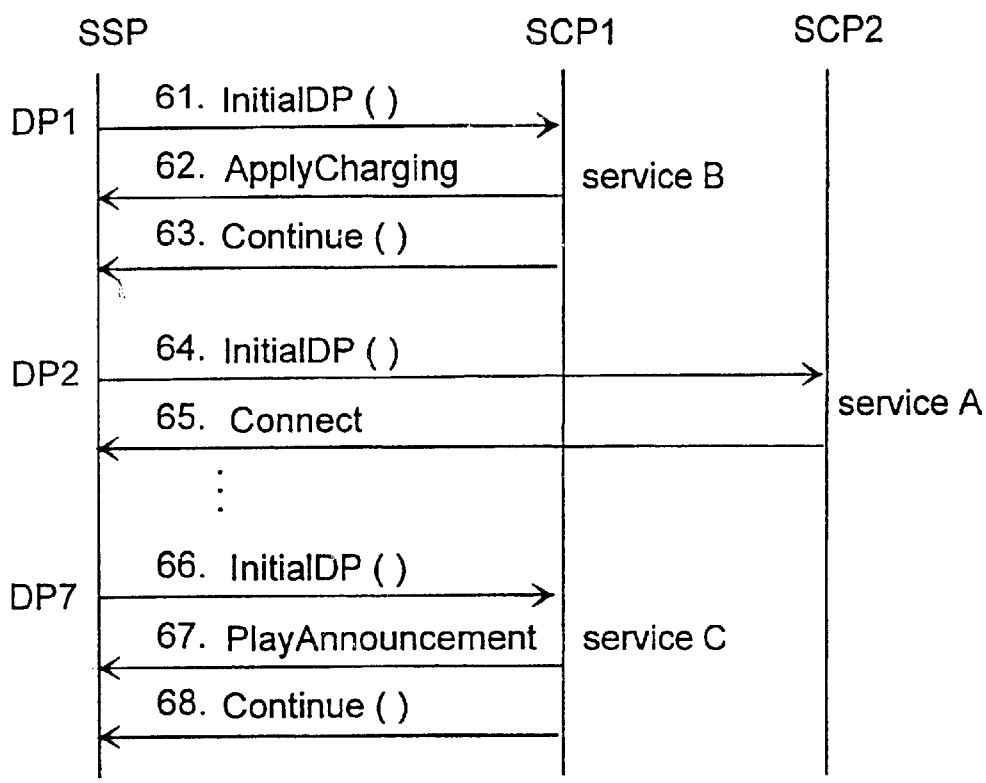
FIG. 6 shows network operations demonstrating the functionality of an intelligent network according to the invention at detection points.
Figure 7A:
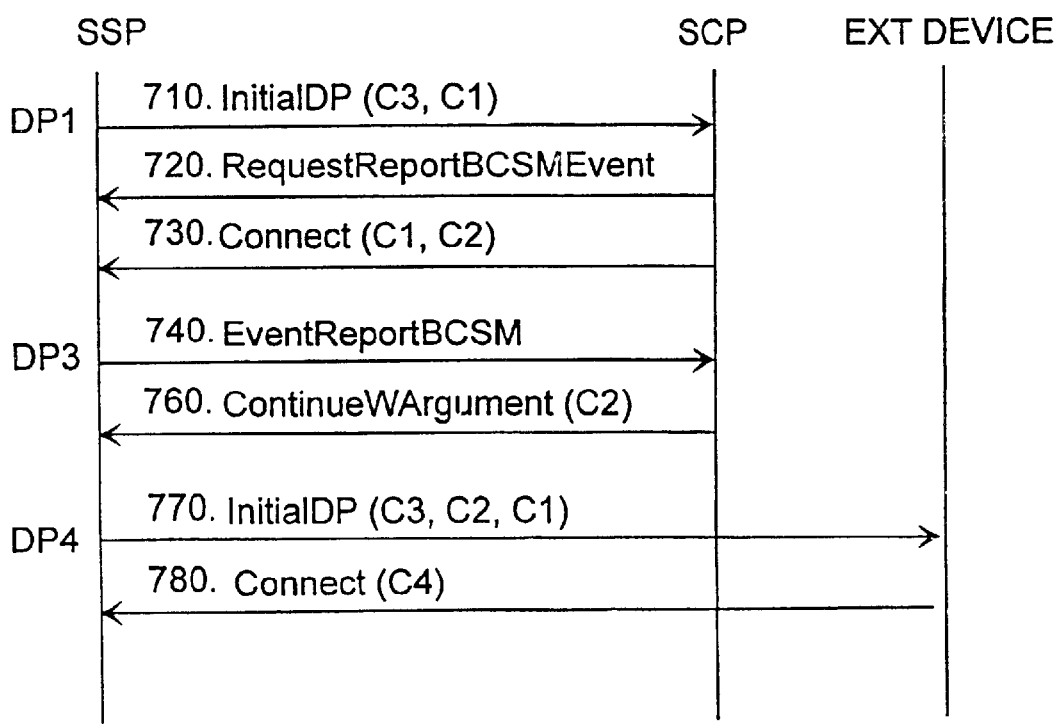
FIG. 7a shows the relinquishment of controllability class allocation initiated by a service program as network operations according to the first embodiment of the invention.

FIG. 6 shows as network operations the functionality described above at some detection points in an intelligent network. At point 61 Service Program B is started when the InitialDP service request is sent. In the first embodiment of the invention, attached to this operation is the controllability class which has been allocated to Service Program B, i.e. the charging control in the example described above. At point 62 SCP1 sends to the SSP a state-of-the-art ApplyCharging operation. At point 63 SCP1 sends to the SSP a Continue operation. In this operation SCP1 can include as an acknowledgement the controllability class allocated to Service Program B. At point 64 the switching point SSP starts Service Program A by sending to SCP2 the InitialDP operation, to which is attached in accordance with the first embodiment of the invention the controllability class allocated to Service Program A, i.e. connection control. At point 65 SCP2 sends to the SSP a state-of-the-art Connect operation. Again SCP2 can include in this operation acknowledgement of controllability class allocation. At point 66 the SSP starts Service Program C by sending to SCP1 the InitialDP service request, to which in accordance with the first embodiment of the invention is attached the controllability class allocated to Service Program C, i.e. the user interaction control. At point 67 SCP1 sends to the SSP a state-of-the-art PlayAnnouncement operation. At point 68 SCP1 sends to the SSP a Continue operation, which may also include the acknowledgement as described above. In another implementation of the first embodiment, the SSP does not inform the SCP of the allocation of a controllability class. In that case, the service program initiated sends instructions to the SSP, which either accepts or rejects them depending on whether or not they are within the scope of controllability allocated to this service program. To the first embodiment of the invention can be added the functionality of changing the allocation of controllability class. The service programs and/or the switching point may initiate this functionality. FIG. 7a shows an example of this functionality as a signaling diagram when the SCP starts the changing operation. In order to enable the SCP to choose a new controllability class from those which are still free, the SSP sends information on all allocated controllability classes to the SCP. At point 710, the switching point sends an InitialDP service request, with accompanying information in accordance with the invention on controllability classes allocated to other service programs and on the controllability class allocated to the service program in question, in this example controllability class C3 is allocated to some other service program and controllability class C1 for the service program receiving the service request. At point 720 the SCP sends to the SSP a state-of-the-art RequestReportBCSMEvent operation, wherein the SCP allocates the detection point DP3 to its control. At point 730 the SCP sends to the SSP a Connect operation, with information in accordance with the invention on the requested controllability classes; in this example, in addition to controllability class C1 controllability class C2 is requested. The controllability class of this service program is thus changed to include both C1 and C2. At detection point DP3 at point 740 the SSP sends to the SCP a state-of-the-art EventReportBCSM operation. At point 760 the SCP sends to the SSP a ContinueWArgument operation, with information in accordance with the invention on relinquishment of a controllability class by requesting only the controllability class C2. The controllability class of the service program is changed to C2 and the allocation of controllability class Cl is revoked. Alternatively, the notification on relinquishment of controllability class allocation can be relayed to the SSP connected to some other state-of-the-art operation, or the SSP may also ascertain the relinquishment of a controllability class from state-of-the-art operations received, e.g. when EDP-R detection points are no longer allocated. Next, the SSP sends to the second SCP, or to some other mechanism carrying out the functionality of the SCP, an InitialDP service request, with information in accordance with the invention on controllability classes as described above (point 770). Allocated controllability classes now include C3, C2, and also C1, which has just been allocated to the service program in question. At point 780 the mechanism carrying out the SCP functionality sends to the SSP a Connect operation, with information in accordance with the invention on the requested controllability class C4. Similarly the SSP may initiate a change in allocation of the controllability class by attaching a new controllability class to an operation. In the first embodiment of the invention, the need for the initiation of service programs may be met either in succession or simultaneously. When more than one service program is to be started simultaneously, a check has to be made whether those service programs have been allocated the same controllability class to their use. If this is the case, one must be chosen from among the service programs. One possible criteria for the selection is the service protocol. An example of such a case is a service program implemented with at least two different protocols, such as CS-1 and CAMEL (Customized Applications for Mobile Enhanced Logic). When the subscriber is in the home network, the CS-1 protocol is preferred, and thus the service program implemented with CS-1 is started and the CAMEL version of the service program is abandoned. In a call made while the subscriber is roaming in a visited network, the service program implemented with CAMEL is preferred, and thus started and the CS-1 version of the service program is then abandoned. The preferences and other subscriber information relating to this feature is advantageously stored in the subscriber profile in the subscriber register. This information is retrieved from the register when needed, and it can be forwarded to other registers and/or switching units attached to location updates. Preferably a new parameter indicating the preference is created.

Figure 5B:
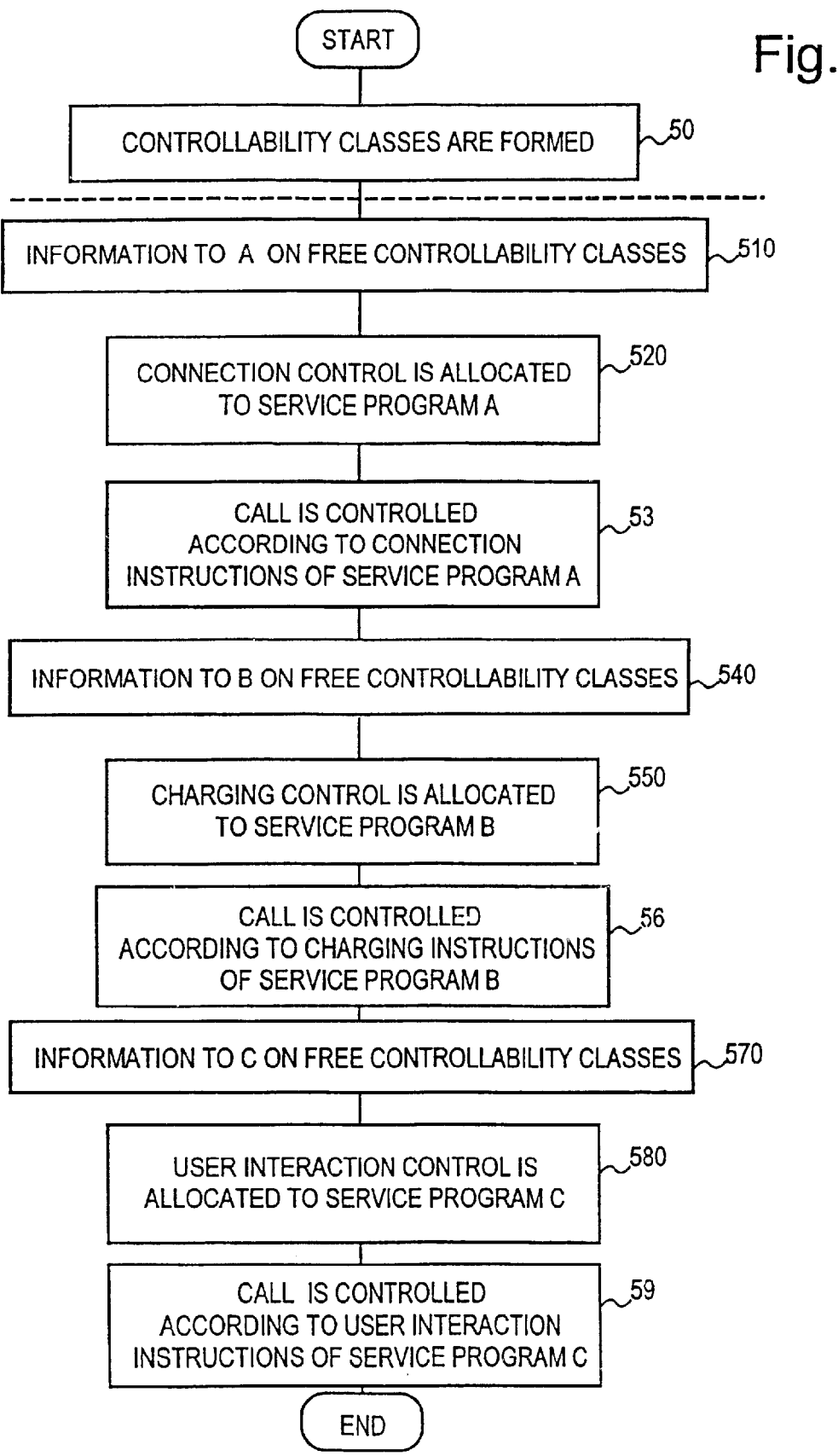
FIG. 5b is a flow chart of the second embodiment of the method according to the invention.

FIG. 5b shows the second embodiment of the invention, where the allocation of a controllability class is carried out by the service program. The flow chart in FIG. 5b corresponds to that in FIG. 5a for the points with the same numbers. Therefore, at point 50 the controllability of the connection is divided into controllability classes according to the invention as described above in connection with the first embodiment. When starting Service Program A, e.g. when a service request is made, information on free controllability classes is relayed from the switching point to Service Program A (point 510). This information may be supplied as a list of allocated controllability classes or as a list of controllability classes still free. In the example shown in FIG. 5b, Service Program A is informed at point 510 that all controllability classes, i.e. the charging control, the connection control, and the user interaction control, are still free. The information on free controllability classes is supplied to the service program, e.g. in connection with a state-of-the-art intelligent network operation. At point 520 Service Program A allocates the connection control to its own use. Information on the allocation of this controllability class may be provided to the switching point, e.g. by attaching this information to some operation to be relayed to the switching point, or the switching point itself may conclude from operations received that the service program has allocated the connection control to itself. At point 53 instructions for routing are accepted from Service Program A. When Service Program B is started, information is given at point 540 from the switching point to Service Program B about free controllability classes in the same way as was described above in connection with the description of point 510. In the example shown in FIG. 5*b*, the controllability classes free at this stage are the charging control and the user interaction control. Service Program B allocates the charging control controllability class to its own use and makes this known to the switching point, e.g. by attaching the information to some operation to be relayed to the switching point or by giving instructions within the sole scope of that controllability class (point 550). At point 56 instructions for charging are accepted from Service Program B. Further, when Service Program C is started, information is given at point 570 from the switching point to Service Program C that the only controllability class still free is the user interaction control. Service Program C allocates this last free controllability class to its own use and makes this known to the switching point, e.g. by attaching the information to some operation to be relayed to the switching point or by giving user interaction instructions (point 580). At point 59 instructions for user interaction are accepted from Service Program C.

In the second embodiment of the invention, information on available controllability classes is attached to the InitialDP operation at point 61 in FIG. 6, e.g. as an announcement that no controllability class has been allocated. At point 62 SCP1 sends to the SSP a state-of-the-art ApplyCharging operation. At point 63 SCP1 sends to the SSP a Continue operation, with accompanying information in accordance with the second embodiment of the invention on allocation of the controllability class of charging control. At point 64 the switching point SSP starts Service Program A by sending to SCP2 the InitialDP operation, to which is attached in accordance with the second embodiment of the invention information on free controllability classes, e.g. as an announcement that the charging control has been allocated. At point 65 SCP2 sends to the SSP a state-of-the-art Connect operation, and on receiving this the SSP concludes that Service Program A has allocated the connection control to its own use, since it has given instructions from the scope of this controllability class. At point 66 the SSP starts Service Program C by sending to SCP1 the InitialDP service request, with accompanying information on free controllability classes in accordance with the second embodiment of the invention, e.g. with an announcement that the charging control and the connection control are allocated. At point 67 SCP1 sends to the SSP a state-of-the-art PlayAnnouncement operation. At point 68 SCP1 sends to the SSP a Continue operation, with accompanying information in accordance with the second embodiment of the invention on allocation of the controllability class of user interaction control for use by Service Program C.

Figure 7B:
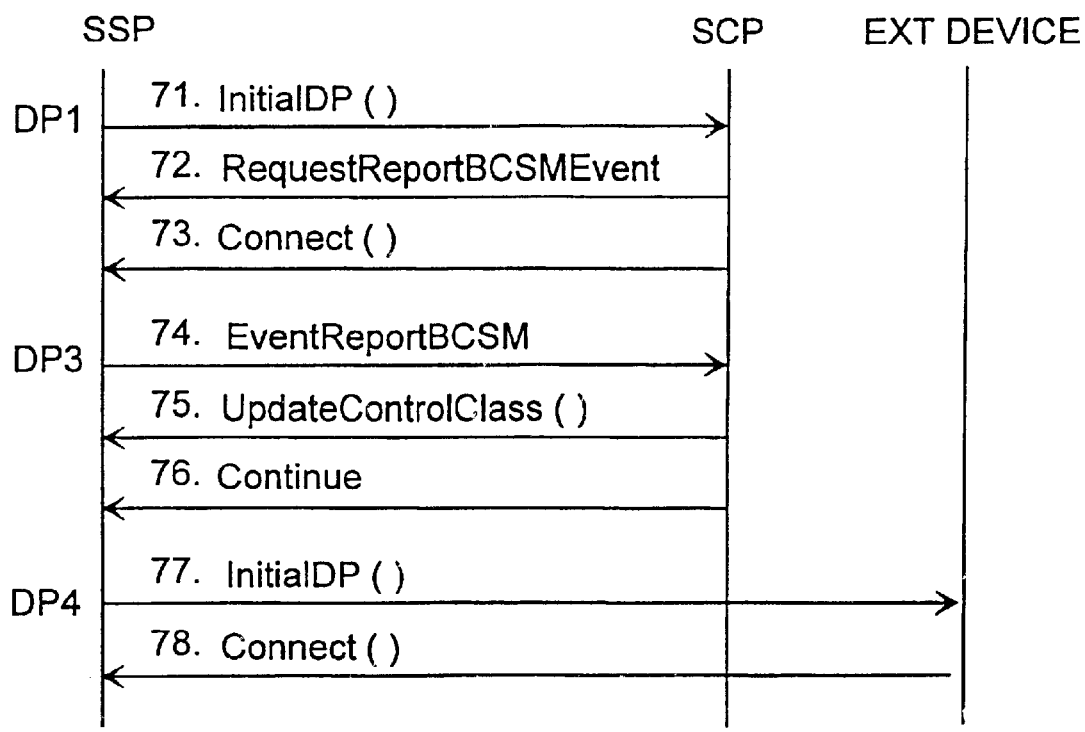
FIG. 7b shows the relinquishment of controllability class allocation initiated by a service program as network operations according to the second embodiment of the invention.

Also to the second embodiment of the invention can be added the functionality of changing the controllability class allocated. The service programs and/or the switching point may initiate this functionality. FIG. 7*b* shows a change of controllability class initiated by the SCP. At point 71 in FIG. 7*b*, the switching point sends an InitialDP service request, with information in accordance with the invention on free controllability classes. At point 72 the SCP sends to the SSP a state-of-the-art RequestReportBCSMEvent operation, whereupon the SCP allocates detection point DP3 for its control. At point 73 the SCP sends to the SSP a Connect operation, with information in accordance with the invention on allocation of the controllability class of connection control. At detection point DP3 at point 74, the SSP sends to the SCP a state-of-the-art EventReportBCSM operation. In order to change the allocation of controllability class, the SCP sends to the SSP at point 75 an UpdateControlClass operation in accordance with the invention, which relays to the SSP the information that the SCP wishes to relinquish the connection control which has been allocated to it. The SSP then frees the connection control for allocation to other service programs. Alternatively, notification on relinquishment of controllability class allocation can be relayed to the SSP as an attachment to a state-of-the-art operation or the SSP may also ascertain the relinquishment of controllability class from state-of-the-art operations received, e.g. when EDP-R detection points are no longer allocated. At point 76 the SCP sends to the SSP a state-of-the-art Continue operation. Next, the SSP sends to the second SCP or to some other mechanism carrying out the functionality of the SCP an InitialDP service request, with information in accordance with the invention on free controllability classes (point 77). The free controllability classes now also include the controllability class of the control which was made free by the SCP in the foregoing. At point 78 the mechanism carrying out the SCP functionality sends to the SSP a Connect operation, with accompanying information in accordance with the invention on allocation of the controllability class of connection control.

In a similar manner it is possible to perform a change of controllability class, if the SCP wishes to enlarge its control. One possibility here which may be preferable is that the SSP rejects any change of controllability class.

Figure 8:
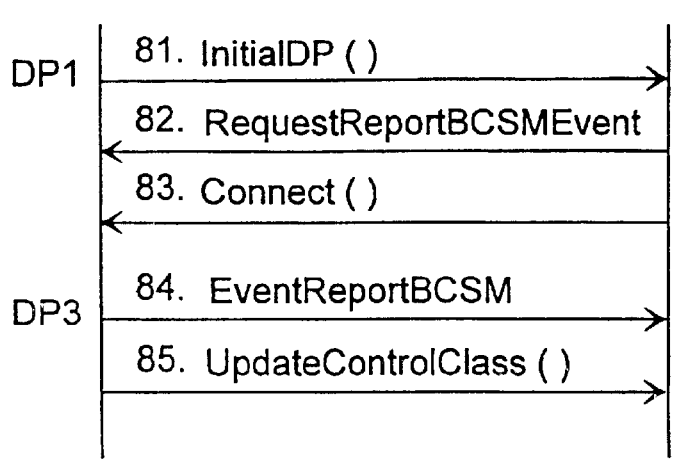
FIG. 8 shows the revocation of controllability class allocation initiated by the switching point as network operations.

FIG. 8 shows an example of how allocation of the controllability class is revoked in the second embodiment of the invention when initiated by the SSP. Points 81–83 in FIG. 8 correspond to points 71–73 in FIG. 7*b*, which were described above and in which in accordance with the invention the connection control is allocated for use by the SCP. At point 84 in FIG. 8, the SSP sends a state-of-the-art EventReportBCSM operation. At point 85 the SSP sends to the SCP an UpdateControlClass in accordance with the invention, with the information that the SSP is revoking the allocation of the connection control. Alternatively, the notification of revocation of controllability class allocation may be relayed to the SCP in connection with a state-of-the-art operation. Revocation of controllability class allocation is necessary, for example, when the SSP ascertains that a call has become a priority call, even an emergency call, and does not allow the SCP to control the call any longer. Thereafter the SSP will no longer accept any connection instructions sent by the SCP.

The initiation of Service Programs A, B, and C may be performed in any order. For instance, Service Program B could start at detection point OriginatingAttemptAuthorized, Service Program A at detection point InfoCollected, and Service Program C at detection point O-Answer. With the use of controllability classes it is also possible to carry out the initiation of several services at the same detection point. For example, if service B starts at detection point OriginatingAttemptAuthorized, then service A may be started at the same detection point once the instructions from Service Program B have been received. The control is hereby transferred from the SSF to the CCF only when both services B and A have started and have given their call instructions at the OriginatingAttemptAuthorized detection point. The control allocated to the service in accordance with the invention is freed for other use in the same way as the state-of-the-art single point of control.

Figure 9:
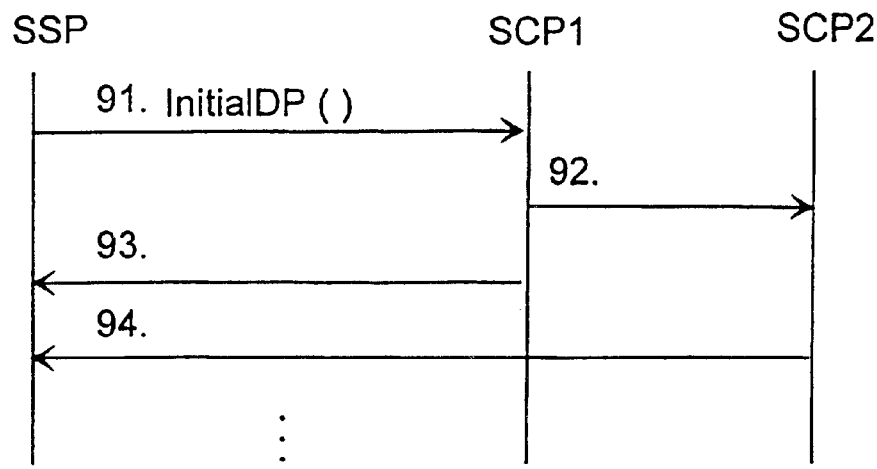
FIG. 9 shows another embodiment of the invention as network operations.

The following is a description of yet another embodiment of the invention with reference to FIG. 9. This embodiment can be combined with either one of the embodiments described above. At point 91 of FIG. 9, the SSP sends to SCP1 an InitialDP service request, with information in accordance with the invention on allocated controllability classes and also specific information as to which service control point and which service program each controllability class has been allocated to. Upon receiving the service request, SCP1 finds that a part of the service needs a controllability class which has already been allocated to a service program at some other SCP, e.g. at SCP2. At point 92, SCP1 then sends directly to the said service program at the other SCP a further service request in accordance with the invention, wherein SCP1 requests that the part of the service allocated to the control of the other SCP be performed. SCP1 sends to the SSP instructions about the part of the service within the scope of its control authorization (point 93), and SCP2 sends to the SSP instructions about the part of the service within its own control (point 94). The functionality described above is made possible by the information relayed to the SCP as to where the other controllability classes have been allocated, preferably in the form of an SCP address and a service program address.

In a similar manner the SCP may send a further service request to another SCP when the entire service requires a controllability class which has been allocated to the service program of some other SCP. The SCP may also send further service requests to various SCPs, when the controllability classes required by the service have been allocated to service programs of other SCPs.

The controllability class allocation information in accordance with the invention which was presented above is preferably stored in the proximity of the switching point SSP. The information is preferably stored in the form of an SCP address and a service program address. According to the invention, only one service program at a time can be allocated a certain controllability class. When more than one service program requires the same controllability class simultaneously, a conflict arises. To deal with this kind of conflict, a new parameter Feature Interaction Instruction (FII) indicating a method of operation in such cases can be introduced into the network. The method of operation in conflict situations can be one of the seven following service interaction mechanisms: 1) The service is ignored and the call is continued without activating this service. This method is convenient for services which do not affect the course of the call, such as a service giving an announcement with some supplementary information not essential for the routing of the call. 2) The call is released. This method is suited for services such as the Prepaid Calling Card. 3) The relationship between the switching point and the service program is changed into a monitoring relationship where the service program can not give instructions to the switching point. The service program is informed of this change when an InitialDP operation is sent which is identifiable as of a notification nature, for example. This gives the service control point the information that the service program was due to be activated. Sometimes this is advantageous for statistical reasons, for example. Examples of such services are those which are to be performed totally within the SCP and a service merely giving an announcement which in the conflict situation is not feasible. 4) The service program is activated with limited control authorization. In this case, instructions are not accepted from the service program within the authorization of the whole controllability class allocated to it. An example of such a service is a case when number transformation would normally be performed, but with limited controllability only an announcement describing the situation is given. 5) The relationship between the switching point and the service program is changed to a monitoring relationship and information on the controlling SCP in the desired controllability class is transmitted to the monitoring service program. Information on the controlling SCP preferably includes the address of the controlling SCP and possibly the address of the controlling service program within the SCP. This method is especially applicable in networks where the SCPs are able to communicate with one another. Thus, instructions may be transferred from the monitoring service program to the controlling service program which relays the instructions to the switching point. 6) The relationship between the switching point and the service program is changed to a monitoring relationship and the InitialDP operation is sent to the SCP only at the end of the call with a report containing information relating to the call, such as the Call_Information_Report operation. 7) The operation of the controlling service program with the controllability class required is terminated, and the controllability class is re-allocated to the other service program requiring this controllability class, whereupon the latter service program is initiated. This method is of use with service programs belonging to different standards, such as CoreINAP and CAMEL, in such a way that CoreINAP service programs are favored over other standards when in the home network and CAMEL service programs when the subscriber is roaming in a visited network. The methods of operation described above are advantageously applied to the service program that is to be activated. Nevertheless, these same methods can be applied to an activated service program when this is desirable and realizable.

The new parameter FII can be retrieved from the service information in the subscriber profile, from the service related information of the switching unit, or based on the home network of the subscriber. The FII and all the data on controllability classes are independent of each other. Therefore, they need not be stored in the same storage place.

Figure 10:
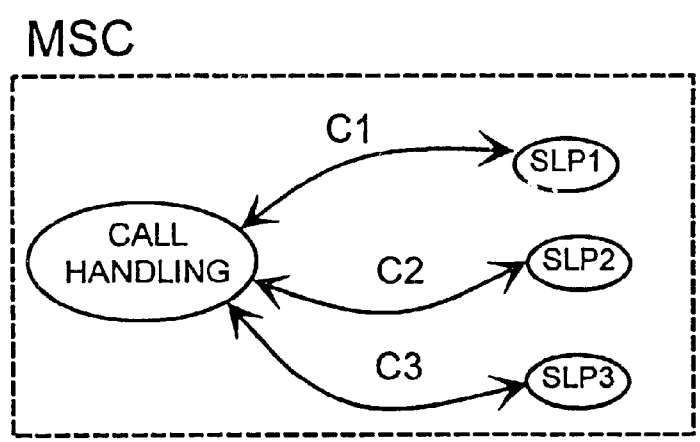
FIG. 10 shows the structure of a switching center with control relationships according to the invention.

FIG. 10 shows a mobile communications network structure with control relationships according to the invention. Within the mobile services switching center MSC, there are controlling relationships with the different controllability classes C1, C2, and C3 between the switch-based services SLP1, SLP2, SLP3 and the entity handling the call. Controllability classes are allocated and instruction received according to the invention described above. Instructions can be given and received at any time during the call.

The subscriber profile information needed for the invention is sent according to prior art from the subscriber register, such as the Home Location Register HLR in GSM, to the switching point, e.g. SSP, MSC, or GMSC, possibly via another register, such as the Visited Location Register VLR. In some implementations the subscriber profile information may also be updated by the SCP with non-call related instructions.

When receiving instructions from a service program, the switching point checks whether the instructions are within the controllability class authorization of that service program. If they are not, examples of possible responses of the switching point are: rejection of the instructions, release of the call, termination of the IN-connection in question, or issuance of an alarm to the network.

Controllability classes allocated according to the invention are made available for possible re-allocation whenever the controllability requirement for the service program has sufficiently decreased and its allocation has been freed for other use, when the controlling relationship of a service program is changed to a monitoring relationship, or when the service or the call ends. The invention presented in this application offers a mechanism for realizing feature interaction management in telecommunications networks. By using controllability classes as defined above, different services can be made comparable with one another and the interaction between them is facilitated. Thus the simultaneous functioning of services controlling different aspects of the call is made possible.

The drawings and the explanations related to them are only intended to illustrate the inventive idea. The distribution of services in accordance with the invention may vary in detail within the scope defined by the claims. The embodiments and implementations described above can also be combined in some appropriate manner when needed. Although the invention is described above mainly in terms of SCP connections, the method may also be used with connections of other kinds between the switching point and a control element carrying out a functionality corresponding to the SCP. The switching unit example presented above was an SSP in an IN-network, but a mobile services switching center or any other switching unit is possible as well. The service programs described above can be switch-based services, e.g. supplementary services of the GSM, IN-services, or services similar to IN-services but with some interface other than an IN-interface between the controlling program packet and the controlled switching unit, e.g. a special number portability database or a calling name database. The invention is also applicable when using different protocols, such as CoreINAP or CAMEL, even for service programs in the same BCSM for contacting control points. In the method according to the invention, information to be relayed may also be transferred in connection with operations other than those presented above and at other times than at detection points, e.g. in connection with state-of-the-art spontaneous messages, such as ReleaseCall or Cancel.

What is claimed is:

1. A method of distribution of services in a telecommunications network including at least one switching point and several service programs, in which method in connection with the call a control relationship is formed between the switching point and the service program which supplies it with instructions, the method comprising:

dividing the controllability of the relationship between a switching point and a service program into controllability classes, allocating, for the service program controlling the switching point, at least one controllability class so that each controllability class is allocated to only one service program at a time, and controlling the call by the service program within the limitations of the control authorization of each controllability class allocated to the service program.

2. The method according to claim 1, wherein the switching point allocates a controllability class to the service program.

3. The method according to claim 2, wherein the switching point informs the service program of the allocation.

4. The method according to claim 3, wherein the switching point informs the service program of all allocations made to service programs.

5. The method according to claim 2 whereby at least two service programs are to be initiated in parallel, wherein when the same controllability class is needed for those service programs, the selection is made of the service program to be activated based on service information and other service programs requiring the same controllability class are abandoned.

6. The method according to claim 2, wherein the switching point allocates a controllability class to the service program in accordance with service information stored in subscriber information.

7. The method according to claim 2, wherein the switching point allocates a controllability class to the service program in accordance with service information stored at the switching point.

8. The method according to claim 2, wherein the switching point allocates a controllability class to the service program on the basis of the subscriber's home network.

9. The method according to claim 1, wherein in order to allocate a controllability class information is relayed from the switching point to the service program on free controllability classes and notification is given by the service program to the switching point as to the controllability class which it has allocated to its use.

10. The method according to claim 9, wherein notification of the allocated controllability class is provided by information accompanying an intelligent network operation.

11. The method according to claim 9, wherein the allocation of controllability class by the service program for its use is ascertained at the switching point on the basis of the instructions given by the service program.

12. The method according to claim 9, wherein in order to relay information on free controllability classes a list of free controllability classes is sent from the switching point to the service program.

13. The method according to claim 9, wherein in order to relay information on free controllability classes a list of allocated controllability classes is sent from the switching point to the service program.

14. The method according to claim 1 in which method an interaction between service programs already initiated and service programs to be started is identified by comparing the controllability classes attached to those services and when service programs thus compared have overlapping controllability classes, the service program to be started enters a special service interaction mechanism.

15. The method according to claim 14, wherein in the service interaction mechanism the initiation of the service program is aborted.

16. The method according to claim 14, wherein through the service interaction mechanism the call is released.

17. The method according to claim 14, wherein through the service interaction mechanism the service program relationship changed to a monitoring relationship.

18. The method according to claim 14, wherein through the service interaction mechanism the service program relationship is changed to a monitoring relationship and information on the service program holding the allocation of the controllability class required is relayed to the monitoring service program.

19. The method according to claim 14, wherein through the service interaction mechanism the controllability authorization of the service program is limited.

20. The method according to claim 14, wherein through the service interaction mechanism the service program relationship is changed to a monitoring relationship and the service program is initiated only at the end of the call.

21. The method according to claim 14, wherein through the service interaction mechanism the controlling service program is stopped and the new service program is initiated.

22. The method according to claim 1, wherein the controllability class allocation is changed when required.

23. The method according to claim 22, wherein the change of the controllability class allocation is started from the switching point.

24. The method according to claim 22, wherein the change of the controllability class allocation is started from the service program.

25. The method according to claim 23, wherein notification of the change of controllability class allocation is given in a separate operation.

26. The method according to claim 23, wherein notification of the change of controllability class allocation is provided by information contained within an intelligent network operation.

27. The method according to claim 24, wherein a change of controllability class allocation is ascertained at the switching point on the basis of the instructions given by the service program.

28. The method according to claim 1, wherein
information is relayed from the switching point to the service program on the controllability classes of other service programs, and
the service program directs tasks within the scope of the control authorization of a controllability class of another service program to this other service program.

29. The method according to claim 1, wherein information on controllability class allocations is stored in proximity to the switching point.

30. The method according to claim 29, wherein the information on controllability class allocations includes the addresses of the control element and the service program.

31. The method according to claim 1 in which method the service program is initiated, wherein
instructions are sent from the service program to the switching point, and
the switching point verifies that instructions received are within the control authorization of the controllability class allocated to the service program.

32. The method according to claim 1, wherein when a call is interrupted, the call is controlled by several service programs at the same detection point before the call is resumed.

33. A method of distribution of services in a telecommunications network including at least one switching point and several service programs, in which method in connection with the call a control relationship is formed between the switching point and the service program which supplies it with instructions, the method comprising:
dividing the controllability of the relationship between a switching point and a service program into controllability classes,
allocating, to the service program controlling the switching point, at least one controllability class so that each controllability class is allocated to only one service program at a time,
controlling the call by the service program within the limitations of the control authorization of each controllability class allocated to it, and
activating a new service program only by the switching point when the controllability class required by the new service program differs from the controllability classes already allocated.

34. A method of distribution of services in an intelligent network including at least one switching point and at least one control element, where there are several service programs, in which method in connection with the call a control relationship is formed between the switching point and the service program which supplies it with instructions, the method comprising:
dividing the controllability of the relationship between a switching point and a service program into controllability classes,
allocating, to the service program controlling the switching point, at least one controllability class so that each controllability class is allocated to only one service program at a time, and
controlling the call by the service program within the limitations of the control authorization of each controllability class allocated to it.

35. A switching point in a telecommunications network including at least one switching point and several service programs, in which network in connection with the call a control relationship is formed between the switching point and the service program which supplies it with instructions, the switching point comprising:
controllability of the relationship between a switching point and a service program are divided into controllability classes,
the service program controlling the switching point is allocated at least one controllability class so that each controllability class is allocated to only one service program at a time, and
the call is allowed to be controlled by the service program within the limitations of the control authorization of each controllability class allocated to the service program.

* * * * *